United States Patent Office 3,432,208
Patented Mar. 11, 1969

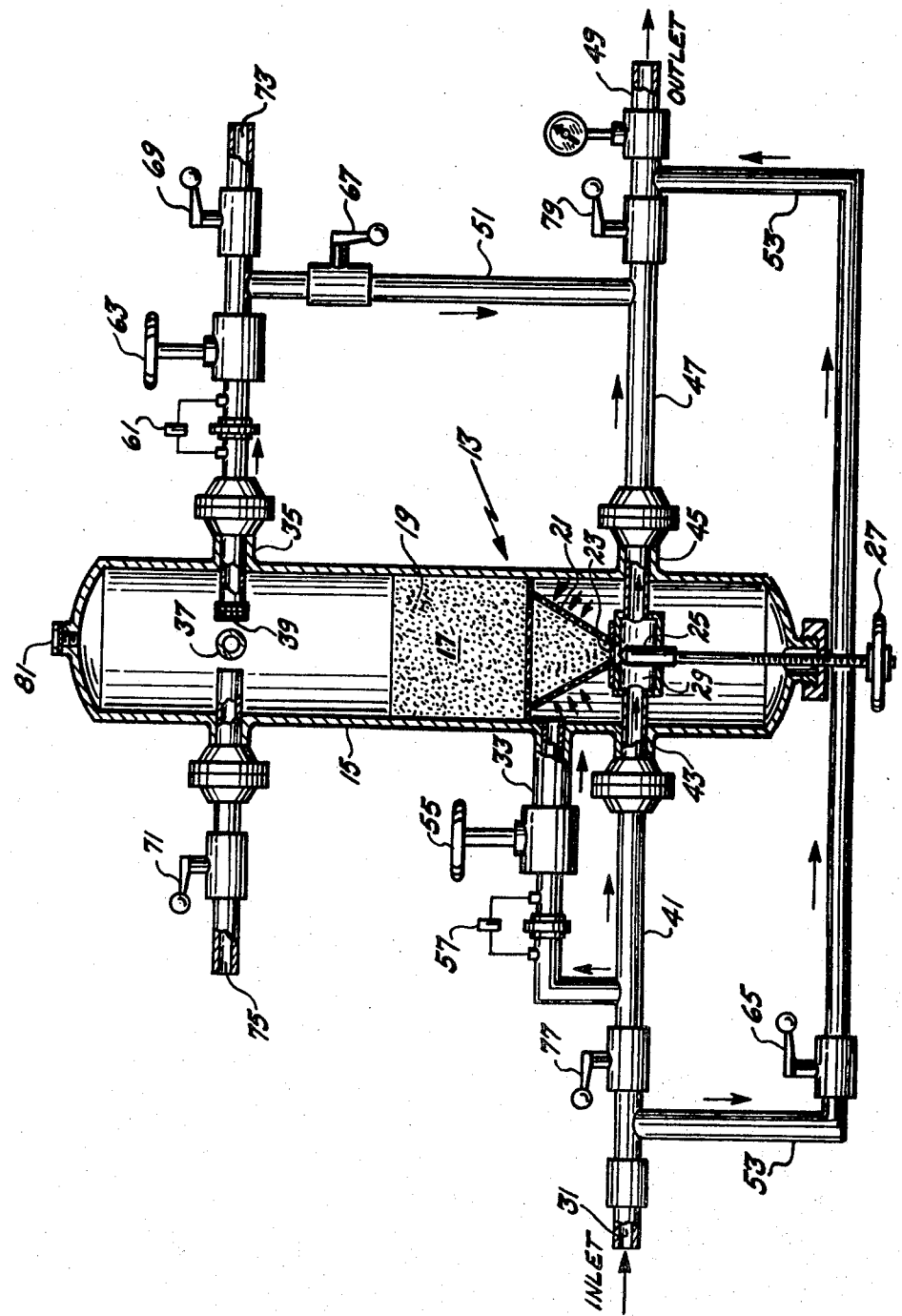

3,432,208
FLUIDIZED PARTICLE DISPENSER
Jacque A. F. Hill, Lincoln, and James S. Draper, Belmont, Mass., assignors to the United States of America as represented by the Secretary of the Air Force
Filed Nov. 7, 1967, Ser. No. 681,302
U.S. Cl. 302—53
Int. Cl. B65g 53/40, 53/58
2 Claims

ABSTRACT OF THE DISCLOSURE

A device for dispersing fluidized micron-size particles in bulk form at a constant weight flow into a high pressure gas flow. A tank containing a bed of particles is provided with a porous cone lower section having an adjustable opening at its apex which is downwardly directed. Pressurized air is introduced from below through the porous cone causing the particle bed to be lifted and fluidized, allowing the minute particles to flow downward through the adjustable opening in the cone and into an entrainment chamber where a moving air stream picks up and delivers the fluidized particles into the high pressure gas flow.

---

This invention relates to the dispersing of fluidized micron-size particles in bulk form, and more particularly to the dispersing of fluidized particles at a constant weight flow into a high pressure wind tunnel for use in the testing of scale model ballistic missiles.

In wind tunnel scale model investigation of ballistic missile boundary layer air current flow, it is desirable to have a constant fluid flow containing clouds of entrained small solid particles surround the model in order to improve the visibility of the flow contours and circulation patterns around the model.

The problem arises as to a means for inexpensively and efficiently admitting these clouds of air containing small solid particles at a very high pressure into the wind tunnel. It is well known that the smaller the particles the clearer is the flow contour pattern around the scale model and the better are the wind tunnel test results obtained. In order to be most effective, these particles should be in the order of 1 micron. However, if particles of this minute size are used, a condition described as "surface forces" causes these particles to cohere to each other and prevent dispersion. Thus, the use of such fine particles would be most desirable if they could be made fluent, and in this fluent condition dispended into the wind tunnel.

Many solutions to this problem have been attempted. For example, initially these small granular particles may be gravity fed into the air stream directly. This solution is unacceptable for two basic reasons: first, the smaller the supply of granular particles becomes the less pressure is exerted on the particles and the flow, therefore, becomes irregular and no longer constant, and, second, the particles have a tendency to cohere to each other and completely stop the flow. Various mechanical means have been used in an attempt to correct these deficiencies. A chopper or mixer was inserted into the flow outlet to prevent the coherence of these fine particles. This solution was not only expensive but also produced the added problem of containing many moving parts, all of which would sooner or later need maintenance and repair. Also, much clogging took place in the outlet and the flow of particles was not constant. Expensive acoustical techniques were also used in attempting to solve the above dispensing problem. However, all the above techniques were found to be ineffective because they produced the undesirable results of uneven flow, unreliability and difficulty of repairs. The acoustical techniques, although partially effective, proved to be highly complicated and expensive to put into practice.

This invention provides for the dispensing of small solid particles to a wind tunnel or the like as a by-product of pressurized flow of fluid through a "bed" of finely divided powder.

Accordingly, it is a primary object of this invention to provide a small solid particle source for a wind tunnel, in which the small solid particles are fluidized by pressurized air and are transported in said fluidized condition to the wind tunnel by the same air pressure source.

Another object of the invention is to provide a fluidizing source which has no moving parts producing a system which is highly reliable and requires little or no maintenance to keep in operating condition.

Still another object of this invention is to provide a constant flow of small solid particles into the wind tunnel. This constant flow rate is maintained for all bed levels, whether full or nearly empty.

A further object of this invention is to provide a fluidized particle dispenser which is economical to produce and utilizes conventional, currently available components that lend themselves to standard mass production manufacturing techniques.

In accordance with this invention the fluidized particle dispenser is made up of a container which holds a sufficient quantity of small solid particles. It also includes a single air pressure source which is used to both fluidize the small solid particles and to transport them to a wind tunnel for the purpose of testing ballistic missile boundary layer air current flow.

These and other objects, features and advantages will become more apparent after considering the following detailed description taken in conjunction with the annexed drawing and appended claims.

In the accompanying drawing there is shown a schematic view of a fluidized particle dispenser according to the invention.

Referring now to the drawing, there is shown a fluidized particle dispenser designated generally by the reference numeral 13. This dispenser 13 includes any suitable container such as a tank 15 containing a granular material 17 which is made up of minute solid particles 19. These solid particles 19 are preferably in the order of 1 micron for the most informative wind tunnel test results. The means for supporting the granular material 17 within the tank is a porous cone 21 located substantially at the bottom of the tank 15. The porous cone 21 is preferably made of sintered titanium. However, the cone 21 may be made of any other suitable material or in any other suitable shape. At the apex of the porous cone 21, which is positioned facing toward the bottom of the tank 15, is an opening 23 which serves as the outlet for the particles 19. Within said opening 23 is a particle feed plug 25. This plug 25 is adjustable by means of a particle feed valve 27 between either a closed position wherein there is no particle flow and an opened position wherein there is maximum particle flow. A particle entrainment chamber 29 houses both the opening 23 and the plug 25.

The air for fluidizing said granular material 17 enters from a source of clean air through the inlet 31 under extremely high pressure, in the range of 2700 p.s.i.a., for example, by way of a first air entry pipe 33. This pipe 33 distributes its pressurized air evenly beneath and through the porous cone 21 in order to fluidize the granular material 17 within the tank 15. The fluidizing air exits by means of a first exit pipe 35 near the top of the tank 15. Also near the top of the tank 15 is a low pressure inlet 37 for particle loading. Covering the exit pipe 35 on the inside of the tank is a sintered metal screen 39, the purpose of which is to prevent small particles 19 from being carried out the exit pipe 35 with the fluidized air. This screen 39, however, may be omitted since it was discovered during testing of the dispenser that the fluidized granular material 17 reached a maximum level within the tank during the fluidization process, much the same as boiling water in a container. For this reason, if no screen 39 is used, the exit pipe 35 must be located above this maximum fluidizing level in the tank 15. Regardless of the amount of fluidizing air which enteres the first inlet pipe 33, none of the minute solid particles 19 are carried out the exit pipe 35 with the fluidizing air.

Air for carrying and dispensing the fluidized solid particles originates from the same single source of clean air and enters through the same inlet 31. This carrying and dispensing air passes through the conduit 41 reaching the bottom of one side of the tank and passing through a second air entry pipe 43. This air entry pipe 43 passes through the particle entrainment chamber 29 where it picks up any particles 19 which may be contained therein and exits by way of a second air exit pipe 45 on the other side of the tank 15. The exit pipe 45 carries the particles into the conduit 47 which connects with a particle dispensing outlet 49 after joining with the conduit 51 which is operatively connected to the first exit 35 containing the fluidizing air. The dispensing outlet 49 connects to a wind tunnel for use in testing ballistic missile flow contours or to whatever use the fluidized particles are to be put. Also connected to the clean air 31 is a by-pass line 53 which is located outside and preferably underneath the tank. This by-pass line 53 connects to the conduit 47 coming from the second air exit pipe 45 just before the particle dispensing outlet 49. The air in the by-pass line 53 is used to accelerate the air in conduit 47 which carries the fluididzed particles to outlet 49.

A control valve 55 along with a differential pressure transducer 57 is located in the line to the first air entry pipe 33 in order to control the amount and the pressure of the air used to fluidize the solid granular particles. There is an air exit control valve 59 along with another differential pressure transducer 61 located in the first exit pipe 35. This control valve 59 controls the amount and pressure of the fluidizing air leaving the tank 15. Another control valve 63 is located in by-pass line 53 and controls the flow of clean air from the inlet 31 into the conduit 47 thereby adjusting the concentration of particle flow by controlling the mixture of clean air with the fluidized particles flowing through conduit 47.

In operation, the system is initially balanced by equalizing the pressure at the first air entry pipe 33 by the pressure transducer 59 and the pressure at the first exit 35 by the pressure transducer 66. As long as these two pressures are equal no particles will flow from the opening 23 into entrainment chamber 29. However, upon regulation of control valve 63 to prevent some of the fluidizing air from escaping through exit 35, fluidizing air is forced down and increases the pressure through the bed of granular material 17. This causes a pressure difference above and below opening 23. The increase in pressure above opening 23 acts to force the fluidized particles through the opening 23, into the particle entrainment chamber 29 and out the second air exit pipe 45. The air carrying the fluidized particles then travels through conduit 47 and dispenses particles from the particle dispensing outlet 49.

The amount of particles 19 admitted to the entrainment chamber 29 is regulated by the feed valve 27. The feed valve 27 is connected to the feed plug 25 which moves into or out of the opening 23 for either decreasing or increasing the particle flow therefrom. Another adjustment feature on the dispenser 13 is the ball valve 65. If it is found that the adjustment of particle feed valve 27 is insufficient to regulate the concentration of particles and an incorrect amount reaches the dispensing outlet 49, valve 65 may be either opened or closed accordingly, and more or less clean air will enter the conduit 47 to mix with the particles already therein, changing the concentration ratio. Another ball valve 67 is located in the conduit 51 and serves to control the air flow therethrough. Various other ball valves are included in the system for controlling air flow in the lines. For instance, ball valves 69 and 71 are closed during normal operation, but are open during the filling of the tank 15 with material 17 and during reverse filter cleaning procedure where low pressure air (100 p.s.i.g. max.) is introduced through inlet 73 and exhausts through outlet 75. Also, ball valves 77 and 79 are included for the purpose of controlling air and particle-air mixture flow in the lines in which they are located. In the top of the tank 15 there is located a plug 81 which may be removed and a particle counter (not shown) may be substituted therefor.

Previously, it was very difficult to dispense minute granular particles in a constant uninterrupted flow either because the particles of their size became compacted and would not flow freely through the exit pipe, or because as the amount of particles in the tank decreased, the pressure thereon became less and the amount of particles flowing through the exit pipe also became correspondingly reduced. This is due to the fact that the weight of the "bed" of particles is reduced. In order to overcome this difficulty in some instances a solid weight is placed upon the granular solid. This has proved to be ineffective since fluidization could not then take place, because of the tendency of the small particles to become compacted. It was found that, by fluidizing the particles in the manner hereinbefore described without the use of any additional weight, the particles at the very lowest point in the tank 15 are relieved from the weight of the "bed" above by the admission of air under pressure through the porous cone 21 so that, when the particle feed plug 25 is lowered partially uncovering the opening 23, the particles 19 flow unaffected by the weight of the bed above, whether it is full or close to empty.

Although the invention has been illustrated in the accompanying drawing and described in the foregoing specification in terms of a preferred embodiment thereof, it should be understood that the invention is not limited to this embodiment or to the particular uses mentioned. It will be apparent to those skilled in the art that the invention may also be employed, for example, as a means for introducing dust or foreign particles into and air stream at constant rates in order to study the effect on animals or to provide medication in the form of solid particles for inhaling by patients having certain respiratory problems. Also, it should be understood that various changes, alterations, modifications, and substitutions, particularly with respect to the construction details, can be made in the arrangement of the several elements without departing from the true spirit and scope of the appended claims.

Having thus described our invention, what we claim and desire to secure by Letters Patent of the United States is:

1. A device for dispersing fluidized micron-size particles in bulk form at a constant weight flow into a high pressure gas flow, said device comprising an upstanding tank containing a bed of granular material composed of minute particles, a porous cone filled with the granular material disposed in the lower section of said tank, said porous cone having the apex downwardly positioned and having an outlet opening in the lowermost section thereof, adjustable valve means positioned in the outlet opening for controlling the flow of particles therethrough, an entrainment chamber located immediately beneath said outlet opening for receiving the particles therefrom, said entrainment chamber having pressurized air lines operatively connected thereto for mixing air with the particles and carrying the mixture to the high pressure gas flow area, a by-pass line forming a connection between the pressurized air lines entering and exiting the entrainment chamber, control means in said by-pass line for regulating the concentration of the air-particle mixture by introducing a supply of clean air in the exit line after the mixture is formed in the entrainment chamber, and means for lifting and fluidizing the granular material in said tank by introducing pressurized air beneath said porous cone and passing it up through said bed of granular material causing fluidization thereof and forcing the fluidized particles through the outlet opening in the entrainment chamber.

2. The device for dispersing fluidized particles defined in claim 1 wherein a first differential pressure transducer is positioned in the pressurized line controlling the flow of air into the area beneath said porous cone and a second differential pressure transducer is positioned in a line above the bed of granular particles in the tank, said transducers operating to control and maintain proper relative pressures above and below the bed of granular material.

References Cited

UNITED STATES PATENTS

| | | | |
|---|---|---|---|
| 2,924,489 | 2/1960 | Beckman | 302—53 |
| 3,007,744 | 11/1961 | Ward et al. | 302—53 |

ANDRES H. NIELSEN, *Primary Examiner.*